United States Patent [19]
Weber

[11] Patent Number: 6,158,796
[45] Date of Patent: Dec. 12, 2000

[54] B-COLUMN ROOF MODULE AND A VEHICLE AND MANUFACTURING METHOD UTILIZING SAME

[75] Inventor: Norbert Weber, Bondorf, Germany

[73] Assignee: DaimlerChrysler AG, Stuttgart, Germany

[21] Appl. No.: 09/419,061

[22] Filed: Oct. 15, 1999

[30] Foreign Application Priority Data

Oct. 15, 1998 [DE] Germany .......................... 198 47 496

[51] Int. Cl.[7] ................................................. B60R 13/01
[52] U.S. Cl. .......................... 296/39.1; 296/208; 296/214
[58] Field of Search .................... 296/39.1, 214, 296/208, 189

[56] References Cited

U.S. PATENT DOCUMENTS

| | | |
|---|---|---|
| Re. 32,165 | 6/1986 | Gerring ................................. 29/401.1 |
| 3,096,601 | 7/1963 | Henry-Biabaud . |
| 3,188,112 | 6/1965 | Oelkrug . |
| 3,560,020 | 2/1971 | Barenyi . |
| 3,876,246 | 4/1975 | Lutz et al. ............................. 296/137 A |
| 3,891,266 | 6/1975 | Wilfert ................................. 296/137 R |
| 4,131,702 | 12/1978 | Alfter et al. . |
| 5,599,086 | 2/1997 | Dutta ....................................... 362/74 |
| 5,641,195 | 6/1997 | Patel et al. ............................... 296/189 |

FOREIGN PATENT DOCUMENTS

| | | |
|---|---|---|
| 01700886B1 | 2/1986 | European Pat. Off. . |
| 0203484A2 | 12/1986 | European Pat. Off. . |
| 0 301 612 | 2/1989 | European Pat. Off. . |
| 0 795 445 | 9/1997 | European Pat. Off. . |
| 128 92 494 | 11/1968 | Germany . |
| 12 89 755 | 2/1969 | Germany . |
| 27 35 531 | 2/1979 | Germany . |
| 90 01 106 | 5/1990 | Germany . |
| 4005884C2 | 11/1993 | Germany . |
| 380845C2 | 4/1994 | Germany . |
| 4309492C1 | 9/1994 | Germany . |
| 297 16 574 | 3/1998 | Germany . |
| 11 78 759 | 1/1970 | United Kingdom . |

Primary Examiner—D. Glenn Dayoan
Assistant Examiner—Mickki D. Murray
Attorney, Agent, or Firm—Evenson, McKeown, Edwards & Lenahan, P.L.L.C.

[57] ABSTRACT

A B-column roof module has fastening points for vehicle interior equipment parts, such as holding grips, lights, etc. The B-column roof module has an oblong basic body which, in the installed condition, extends from the roof-side end of a B-column transversely thereto on a roof frame. In addition, the vehicle interior equipment parts are functionally integrated in the roof module.

32 Claims, 5 Drawing Sheets

B-COLUMN ROOF MODULE AND A VEHICLE AND MANUFACTURING METHOD UTILIZING SAME

BACKGROUND AND SUMMARY OF THE INVENTION

This application claims the priority of German application 198 47 496.2, filed in Germany on Oct. 15, 1998, the disclosure of which is expressly incorporated by reference herein.

The invention relates to a B-column roof module having fastening points for vehicle interior equipment parts, such as holding grips, lights, etc.

From German Patent Document DE 38 20 845 C2, an assembly unit for vehicle roofs is known which has a finished ceiling and a frame. Fastening points for vehicle interior equipment parts, such as sun shields, holding grips and lights, are provided on the frame. Before the vehicle interior equipment parts are fastened to the frame, the vehicle ceiling is mounted on the frame. In the vehicle ceiling, openings are provided for the vehicle interior equipment parts.

In the case of the known assembly unit, it was found to be a disadvantage that the finished ceiling must be fastened first and only then can the vehicle interior equipment parts be fastened. In addition, such a complete assembly unit can only be used for one vehicle type respectively.

From German Patent Document DE 40 05 884 C2, an assembly receiving device is known to be used when mounting finished ceilings. The known assembly receiving device is provided with receiving elements for receiving and prepositioning the finished ceiling to be moved into the vehicle body through window openings as well as additional components, such as holding grips, sun shields and the like and/or fastening devices. For using the same assembly receiving device for different finished ceiling variants, particularly for finished ceilings with and without a closable roof opening, at least some of the receiving elements can optionally be adjusted into a working position adapted to the mounting of one of the finished ceiling variants.

The known assembly receiving device has the disadvantage that its handling is complicated and requires high expenditures. In addition, the assembly receiving device must be removed again after the installation of the finished ceiling and of the vehicle interior equipment parts.

From European Patent Document EP 0 170 086 B1, an arrangement is known for the installation of a roof ceiling in addition to other parts, such as sun shields, holding grips and the like, to be fastened on the roof, in a vehicle body of motor vehicles. In the case of the known arrangement, a mounting frame with receiving and releasing devices for the ceiling to be installed in the vehicle body is preassembled such that the ceiling corresponds to its future final mounted position on the mounting frame. In addition to the ceiling, the other parts to be fastened on the inside on the roof are premounted corresponding to the future final mounted position on the mounting frame. On at least two opposite side edges, the mounting frame has holding elements which are simultaneously used as a centering device for the assembly unit on the roof in the interior of the vehicle body. After the installation of the ceiling and of the parts to be fastened, the mounting frame is then lowered by means of a moving device and is finally moved out of the vehicle body.

Like the above described assembly receiving device, the handling, of this arrangement requires high expenditures and is complicated. In addition, it must also be removed after the installation of the ceiling and of the parts to be fastened.

From German Patent Document DE 90 01 106 U1, a holding device is known for an audio-electronic unit in a motor vehicle. The known holding device comprises a bow-type plastic molding which corresponds to the upper width of the forward windshield of a motor vehicle and has fastening elements on the interior vehicle body side, has a depositing and optionally fastening surface for the unit provided in the center in a recess, and has a wide flange which extends downward and has a downwardly extending, wide flange which has a recess or opening for the rear view mirror holding device. In addition, molded-out sections with recesses for the holding devices of the sun shields are provided at the end of the arms of the bow-type plastic moldings.

In addition, a head protection for motor vehicle occupants is known from German Patent Document DE 1 282 494. The known head protection consists of a plastically deformable body which extends below the forward roof section in the area of the upper edge of the windshield transversely to the vehicle. In this case a body is used, which has an essentially approximately half-shell-shaped construction and can be deformed for receiving deforming energy and which is fastened in a preferably easily detachable manner on the vehicle roof only by means of its forward and/or lateral parts. The rear view mirror and sun shields are linked to the bottom of the deformable body.

From German Patent Document DE 43 09 492 C1, an interior roof console for motor vehicles is known which consists of a plastic molding with an edge elevation and can be added on subsequently. Within the edge elevation in the lowered center area, instruments, switches, lights, loudspeakers and the like are arranged in cutout and openings. In addition, the interior roof console has transversely extending elevations which form several smaller-format indentations for functional groups. The indentations are provided with cutouts for receiving carrier plates for the instruments, switches, lights and the like.

In addition, from German Patent Document DE 1 289 755, a temple protection is known for increasing the internal safety of an occupant compartment consisting of a closed vehicle body, particularly of passenger cars. In this case, a rail is mounted in the area of the upper edge of the side window or of the door openings, which rail extends essentially from the windshield to the rear window and which is fastened on the vehicle body or a lateral roof support at a distance from the side wall by means of deformation members. For forming a grip, the rail may be provided with a recess. In addition, the rail may be constructed as a carrier of additional devices, such as lighting devices for the occupant compartment.

It is an object of the invention to provide a B-column module which can be preassembled in a simple manner and can be used for different vehicle types.

In the case of a B-column roof module having fastening points for vehicle interior equipment parts, such as holding grips, lights, etc., this object is achieved in that the B-column roof module has an oblong basic body which, in the installed condition, extends from the roof-side end of a B-column transversely thereto on a roof frame, and in that the vehicle interior equipment parts are functionally integrated in the roof module. The integration of the vehicle interior equipment parts into the roof module eliminates the removal of the known assembly receiving devices. The vehicle interior equipment parts can be fastened to the B-column roof module before its installation. A B-column roof module, which is preassembled in this manner, can be manufactured at reasonable cost at a systems supplier and can be supplied just in time. Because the B-column roof module extends only in the area of the B-column on the roof frame, the same module can be used for different vehicle types, such as sedans and station wagons.

An advantageous feature of preferred embodiments of the invention is characterized in that the B-column panels are integrated in the roof module. As a result, the transition from the B-column panels to the vehicle ceiling is shifted more into the roof area. The roof module forms a visually attractive end for the vehicle ceiling.

An advantageous feature of preferred embodiments of the invention is characterized in that the cross-section of the roof module is adapted to the shape of a depression in the vehicle roof. As a result, it is achieved that the roof module fills the depression in the vehicle roof. This has the advantage that the visual impression is improved. In addition, it is prevented that dirt is deposited in the depression which can be removed from there only with difficulty.

An advantageous feature of preferred embodiments of the invention is characterized in that an air duct is integrated in the roof module. Air can be introduced through the air duct from outside into the vehicle interior. An unpleasant "dropping" of the air onto the vehicle occupants is prevented.

An advantageous feature of preferred embodiments of the invention is characterized in that a crash box is integrated in the roof module. The so-called crash box has the purpose of reducing, in the event of an accident, forces which particularly act upon the vehicle occupants' heads. This aspect is interesting particularly in view of future safety guidelines.

An advantageous feature of preferred embodiments of the invention is characterized in that the roof module has devices for fastening the roof module on the vehicle roof on the side facing away from the vehicle interior. In a practical manner, the fastening of the roof module on the vehicle roof takes place by means of snap-type connection elements. As an alternative, screwed connections can be used. Naturally the roof module can also be fastened on the vehicle roof or the roof frame by means of a glued connection.

An advantageous feature of preferred embodiments of the invention is characterized in that the roof module is formed of a slightly deformable material. As the result, the risk of injury is reduced in the interior of the vehicle.

In the case of a motor vehicle having a vehicle roof, a roof module of the above-mentioned type and a vehicle ceiling, the above-mentioned object is achieved in that the roof ceiling is arranged between the vehicle roof and the roof module. The fastening of the vehicle ceiling can be implemented by means of the same fastening devices which are also used for fastening the roof module on the vehicle roof. The fastening of the vehicle ceiling can also take place only by means of the B-column roof module, specifically by pressing it against the vehicle roof. The doubling of the material when placing the module on the ceiling provides additional protection.

Additional advantages, characteristics and details of the invention are found in the following description in which various embodiments of the invention are described in detail with reference to the drawing. In this case, the characteristics indicated in the claims and in the specification may be essential for the invention individually or in any combination.

Other objects, advantages and novel features of the present invention will become apparent from the following detailed description of the invention when considered in conjunction with the accompanying drawings.

DETAILED DESCRIPTION OF THE DRAWINGS

Figure 1:
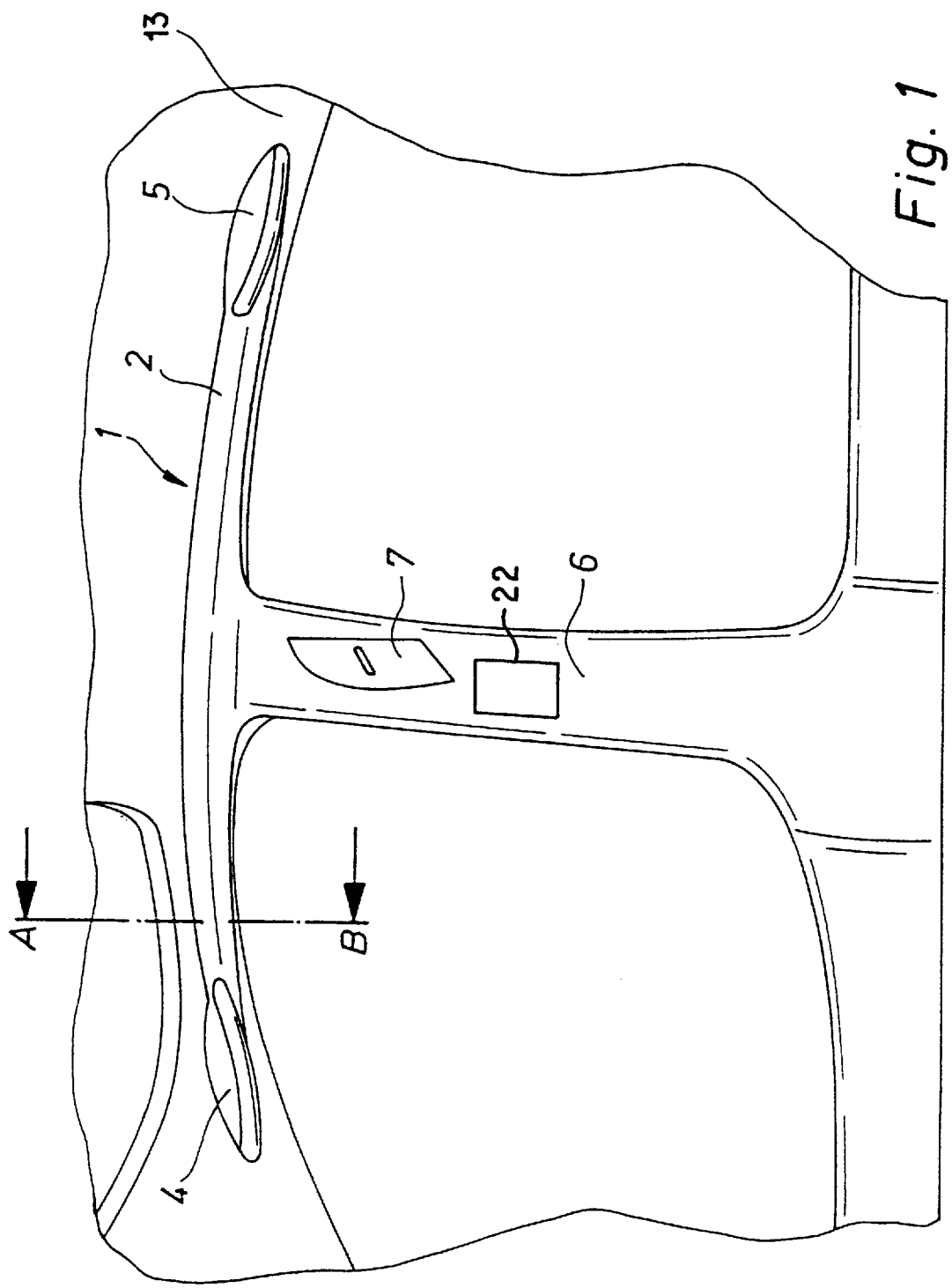
FIG. 1 is a schematic side view of a first embodiment of a B-column roof module according to the invention in the installed condition.
Figure 3:
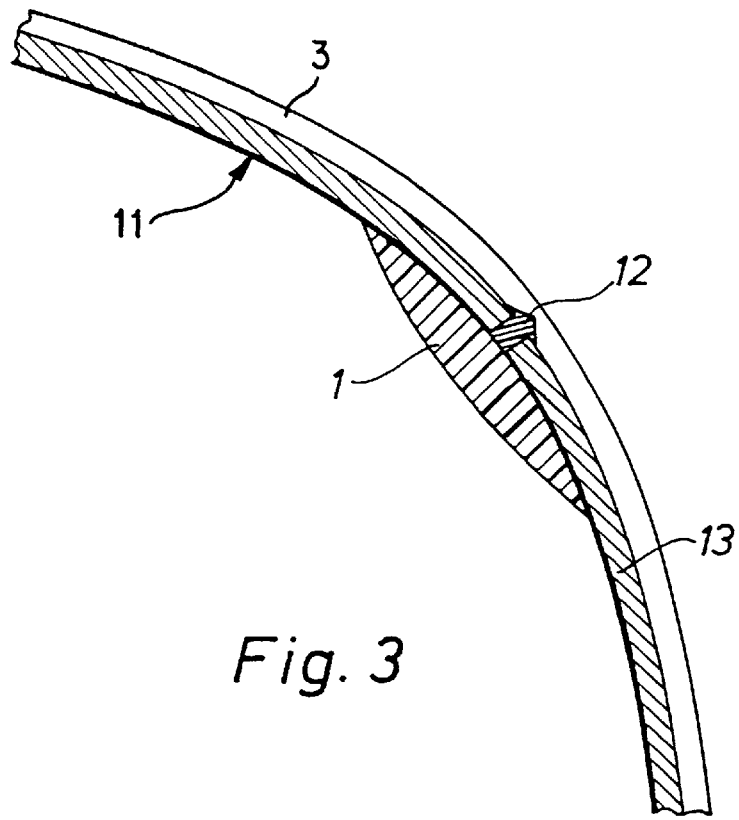
FIG. 3 to 6 are enlarged sectional views along the Line A–B in FIG. 1 according to four different embodiments of the present invention.

In FIG. 1, a B-column roof module according to the present invention on the whole has the reference number 1. The B-column roof module 1 comprises an oblong basic body 2. The oblong basic body 2 is fastened to a roof frame 3 via a vehicle ceiling or headliner 13 of a motor vehicle (as shown in FIG. 3). Holding grips 4 and 5 are constructed at the ends of the oblong basic body 2.

As illustrated in FIG. 1, the B-column panel 6 is integrated in the B-column roof module 1. As the result, the B-column roof module 1 receives a design which is T-shaped as a whole. Reference number 7 indicates that, for example, a holding device for a safety belt can be integrated into the B-column roof module 1. In addition, reference numeral 22 indicates that a crash box can be integrated in the B-column roof module 1.

Figure 2:
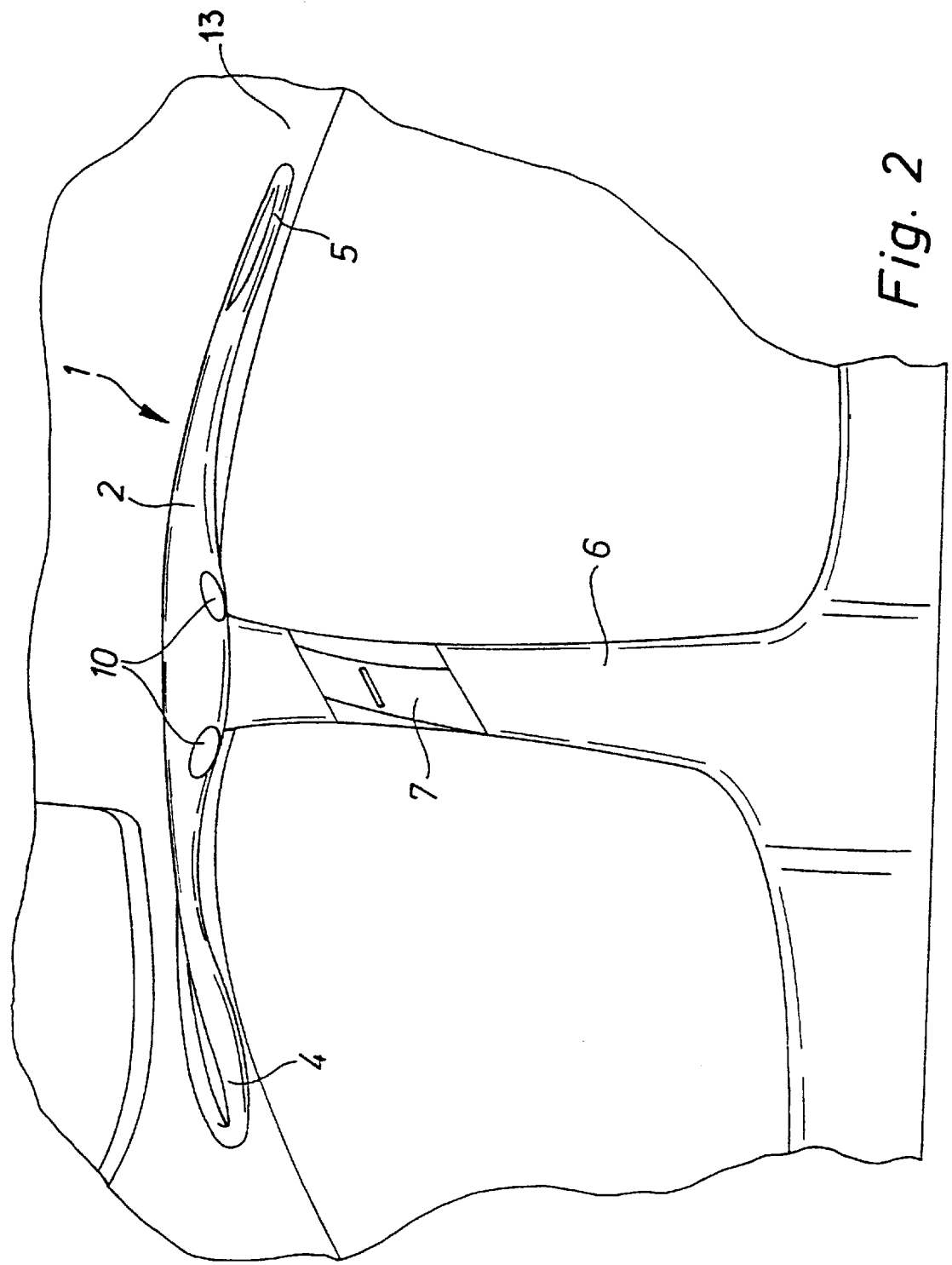
FIG. 2 is a schematic view of a second embodiment of a B-column roof module according to the invention in the installed condition.

FIG. 2 illustrates a second embodiment of a B-column roof module 1 according to the invention. For reasons of simplicity, parts identical to those in FIG. 1 have the same reference numbers. In contrast to the embodiment illustrated in FIG. 1, in the embodiment illustrated in FIG. 2, the oblong basic body 2 does not form one piece with the B-column panel 6. Furthermore, two lights 10 are mounted in the oblong basic body 2. Otherwise, the embodiments illustrated in FIGS. 1 and 2 have essentially the same design. However, in the embodiment illustrated in FIG. 2, the oblong basic body 2 is provided with a slightly greater curvature than in the embodiment illustrated in FIG. 1.

Figure 4:
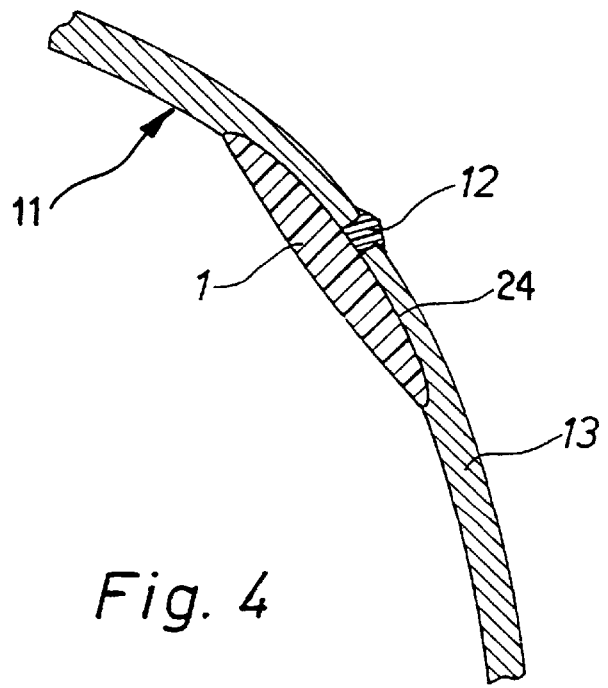
Figure 5:
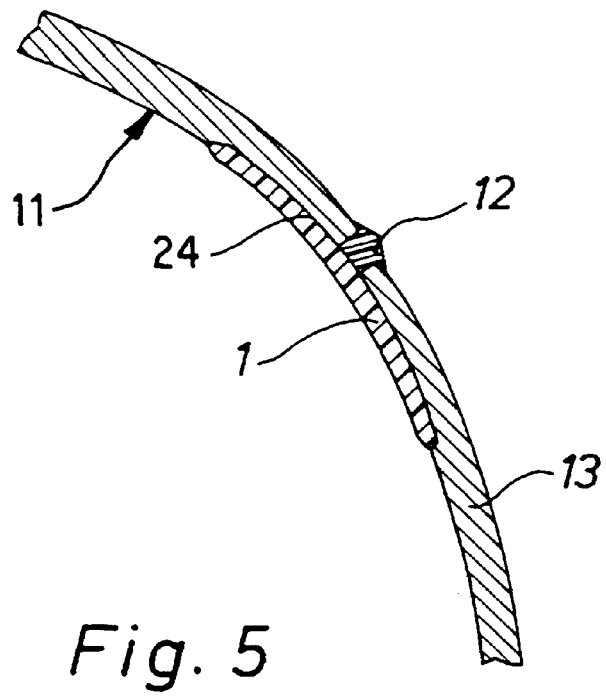

The sectional view of FIG. 3–6 shows that the B-column roof module 1 is arranged in a concavity 11 of the vehicle ceiling or headliner 13. The fastening of the B-column roof module 1 takes place by fastening elements 12. The fastening elements 12 may be formed by snap hooks or clips which are anchored in the roof frame 3 vehicle ceiling 13. The B-column roof module 1 consists of a material with a high deformation potential. Furthermore, FIGS. 4 and 5 illustrate the B-column roof module conforming to the shape of a recessed portion 24 in the vehicle ceiling 13.

FIGS. 4 and 5 show that, in its cross-section on the side facing the vehicle interior, the B-column module 1 may have a convex as well as a concave construction.

Figure 6:
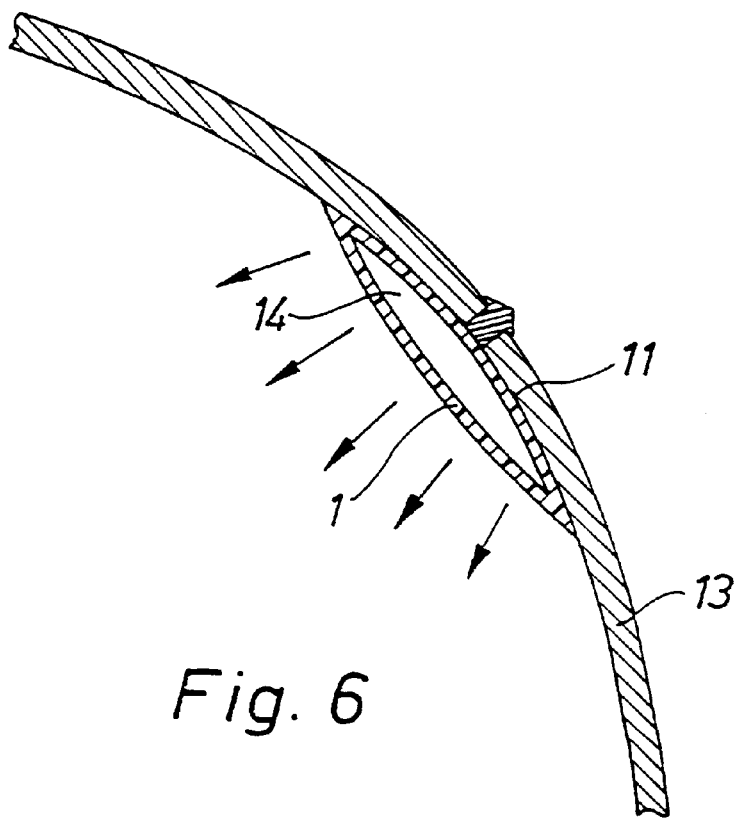

In the embodiment illustrated in FIG. 6, an air duct 14 is constructed in the B-column roof module 1. The air delivered through the air duct 14 can flow out diffusely through openings which are provided in the B-column roof module 1. As an alternative, lamellae can be provided in order to permit a targeted flowing out of the air.

Figure 7:
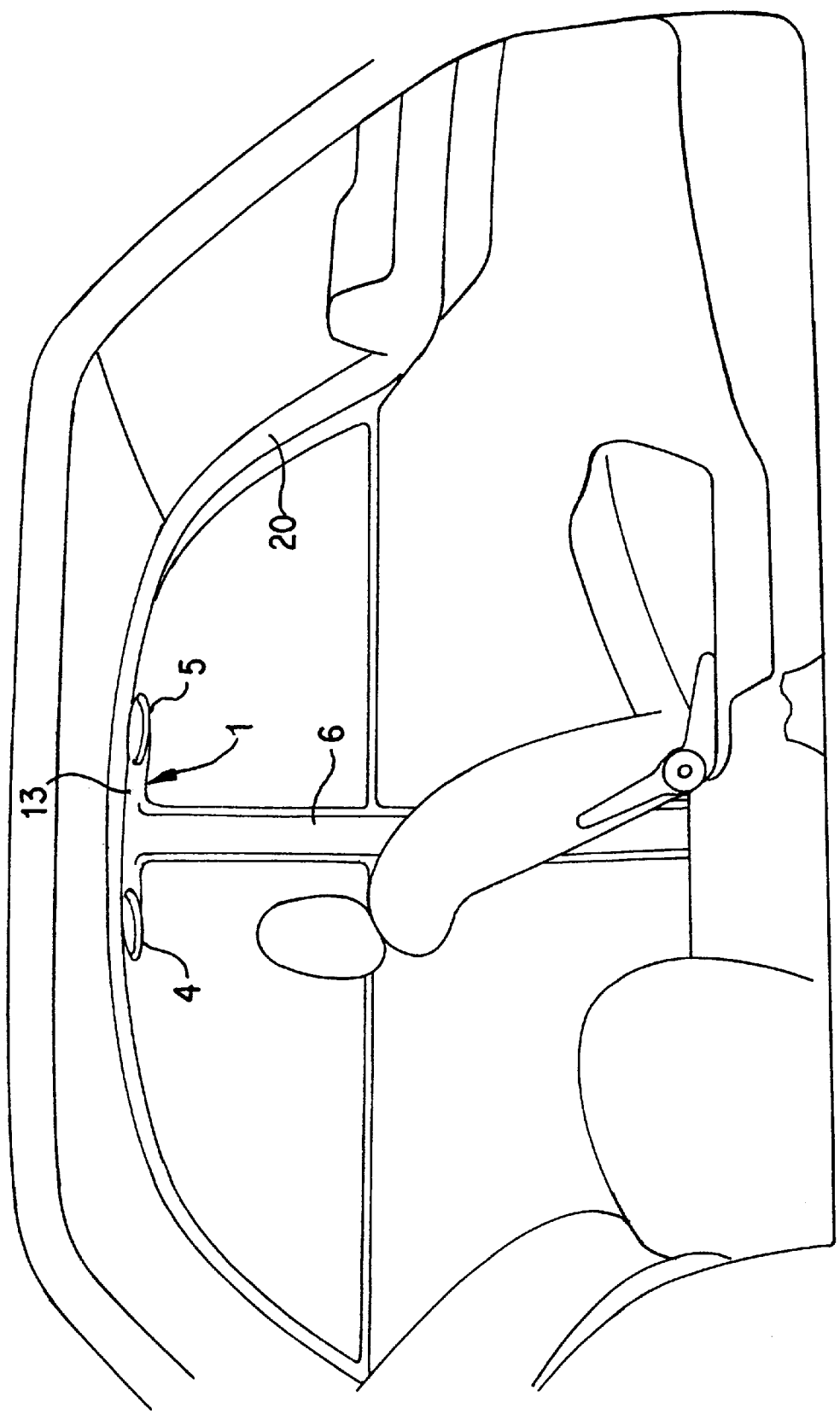
FIG. 7 is a schematic perspective sectional side view showing a motor vehicle and the positioning of the B-column roof module according to preferred embodiments of the present invention.

FIG. 7 schematically depicts the location of the B-column roof module 1 with respect to an A-column 20 and the B-column (panel parts 6) at one side of a passenger motor vehicle. It is to be understood that both sides of the vehicle can include similar B-column roof modules.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. B-column roof module having fastening points for vehicle interior equipment parts, wherein the B-column roof module has an oblong basic body which, in the installed condition extends transversely relative to a roof-side end of a B-column of a roof frame, wherein the vehicle interior equipment parts are functionally integrated in the B-column roof module, and wherein a side of the B-column roof module faces a vehicle ceiling and abuttingly engages a concavity in the vehicle ceiling along substantially an entire length of said side of the B-column roof module.

2. Roof module according to claim 1, wherein B-column panels are integrated in the roof module.

3. Roof module according to claim 1, wherein said side of the B-column roof module facing the vehicle ceiling conforms to the shape of a recessed portion in the vehicle ceiling.

4. Roof module according to claim 1, wherein an air duct is integrated in the roof module.

5. Roof module according claim 1, wherein a crash box is integrated in the roof module.

6. Roof module according to claim 1, wherein on said side of the B-column roof module facing the vehicle ceiling, the roof module has devices for fastening the B-column roof module on the vehicle ceiling.

7. Roof module according to claim 1, wherein the roof module is formed of a slightly deformable material.

8. Roof module according to claim 2, wherein said side of the B-column roof module facing the vehicle ceiling conforms to the shape of a recessed portion in the vehicle ceiling.

9. Roof module according to claim 2, wherein an air duct is integrated in the roof module.

10. Roof module according to claim 8, wherein an air duct is integrated in the roof module.

11. Roof module according to claim 2, wherein a crash box is integrated in the roof module.

12. Roof module according to claim 10, wherein a crash box is integrated in the roof module.

13. Roof module according to claim 2, wherein on said side of the B-column roof module facing the vehicle ceiling, the roof module has devices for fastening the B-column roof module on the vehicle ceiling.

14. Roof module according to claim 9, wherein on said side of the B-column roof module facing the vehicle ceiling, the roof module has devices for fastening the B-column roof module on the vehicle ceiling.

15. Roof module according to claim 12, wherein on said side of the B-column roof module facing the vehicle ceiling, the roof module has devices for fastening the B-column roof module on the vehicle ceiling.

16. Roof module according to claim 2, wherein the roof module is formed of a slightly deformable material.

17. Roof module according to claim 5, wherein the roof module is formed of a slightly deformable material.

18. Roof module according to claim 6, wherein the roof module is formed of a slightly deformable material.

19. Motor vehicle having a vehicle roof, a B-column roof module, and a vehicle ceiling, wherein the B-column roof module has an oblong basic body which, in the installed condition, extends transversely relative to a roof-side end of a B-column of a roof frame, wherein vehicle interior equipment parts are functionally integrated in the B-column roof module, wherein the vehicle ceiling is arranged between the vehicle roof and the B-column roof module, and wherein a side of the B-column roof module faces the vehicle ceiling and abuttingly engages a concavity in the vehicle ceiling along substantially an entire length of said side of the B-column roof module.

20. Motor vehicle according to claim 19, wherein B-column panels are integrated in the roof module.

21. Motor vehicle according to claim 19, wherein said side of the B-column roof module facing the vehicle ceiling conforms to the shape of a recessed portion in the vehicle ceiling.

22. Motor vehicle according to claim 19, wherein an air duct is integrated in the roof module.

23. Motor vehicle according to claim 19, wherein a crash box is integrated in the roof module.

24. Motor vehicle according to claim 19, wherein on said side of the B-column roof module facing the vehicle ceiling, the roof module has devices for fastening the B-column roof module on the vehicle ceiling.

25. Motor vehicle according to claim 19, wherein the roof module is formed of a slightly deformable material.

26. Motor vehicle according to claim 20, wherein said side of the B-column roof module facing the vehicle ceiling conforms to the shape of a recessed portion in the vehicle ceiling.

27. Motor vehicle according to claim 26, wherein an air duct is integrated in the roof module.

28. Motor vehicle according to claim 27, wherein a crash box is integrated in the roof module.

29. Motor vehicle according to claim 28, wherein on said side of the B-column roof module facing the vehicle ceiling, the roof module has devices for fastening the B-column roof module on the vehicle ceiling.

30. Motor vehicle according to claim 29, wherein the roof module is formed of a slightly deformable material.

31. A method of manufacturing a passenger motor vehicle comprising:

forming a B-column roof module separately from a vehicle body which has a roof frame supported on top of a B-column, said B-column roof module including vehicle equipment parts including at least one hand grip and wherein a side of the B-column roof module faces a vehicle ceiling and abuttingly engages a concavity in the vehicle ceiling along substantially an entire length of said side of the B-column roof module, and overlapping said B-column roof module over a top part of the B-column.

32. A method according to claim 31, wherein B-column panels are integrated in the B-column roof module.

* * * * *